(12) United States Patent
Olgaard

(10) Patent No.: US 8,051,609 B2
(45) Date of Patent: *Nov. 8, 2011

(54) WIND TURBINE TOWER AND METHOD OF ASSEMBLING

(75) Inventor: Borge Olgaard, Esbjerg (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

This patent is subject to a terminal disclaimer.

(21) Appl. No.: 12/975,607

(22) Filed: Dec. 22, 2010

(65) Prior Publication Data

US 2011/0088331 A1    Apr. 21, 2011

Related U.S. Application Data

(60) Division of application No. 12/175,138, filed on Jul. 17, 2008, now Pat. No. 7,877,935, which is a continuation of application No. PCT/DK2006/000027, filed on Jan. 17, 2006.

(51) Int. Cl.
*E04H 6/06* (2006.01)
(52) U.S. Cl. .................... 52/30; 52/40; 52/153
(58) Field of Classification Search .......... 52/40, 153, 52/301, 845, 30; 414/595, 662
See application file for complete search history.

(56) References Cited

U.S. PATENT DOCUMENTS

| | | | |
|---|---|---|---|
| 1,870,914 A | 8/1923 | Lane | |
| 1,697,478 A * | 1/1929 | Sandberg | 182/14 |
| 3,034,209 A | 5/1962 | Bianca et al. | |
| 3,517,774 A * | 6/1970 | Meyer | 187/239 |
| 3,968,561 A | 7/1976 | Oakes et al. | |
| 4,216,634 A | 8/1980 | Binder | |
| 4,248,025 A | 2/1981 | Kleine et al. | |
| 4,262,773 A * | 4/1981 | Basham | 182/132 |
| 4,779,389 A | 10/1988 | Landers | |
| 5,117,607 A | 6/1992 | Bourdon | |
| 5,600,537 A | 2/1997 | Gordin et al. | |
| 6,191,355 B1 | 2/2001 | Edelstein | |
| 6,453,636 B1 | 9/2002 | Ritz | |
| 7,160,085 B2 | 1/2007 | de Roest | |
| 7,464,512 B1 | 12/2008 | Perina | |
| 7,591,119 B2 | 9/2009 | Ritz | |

(Continued)

FOREIGN PATENT DOCUMENTS

EP    1231162 A1    8/2002

(Continued)

OTHER PUBLICATIONS

European Search Report; Application No. EP 09 01 2887; Nov. 11, 2009; 6 pages.

(Continued)

*Primary Examiner* — Basil Katcheves
(74) *Attorney, Agent, or Firm* — Wood, Herron & Evans, L.L.P.

(57) ABSTRACT

The invention relates to a wind turbine tower comprising at least two annular tower rings placed vertically on top of each other. The wind turbine tower is characterized in that, a first tower ring overlaps at least a further tower ring of the at least two tower rings. The invention further relates to a wind turbine, a wind turbine tower elevator for use in a wind turbine tower and a method for assembling a wind turbine tower.

14 Claims, 10 Drawing Sheets

U.S. PATENT DOCUMENTS 7,607,276 B2 10/2009 Gordin et al.

FOREIGN PATENT DOCUMENTS

| EP | 1561883 A1 | 8/2005 |
| FR | 2863263 A1 | 6/2005 |
| WO | 0071856 A1 | 11/2000 |

OTHER PUBLICATIONS

International Preliminary Report on Patentability; PCT/DK2006/000027; Jan. 22, 2008; 14 pages.

International Search Report; PCT/DK2006/000027; Sep. 12, 2006; 5 pages.

* cited by examiner

WIND TURBINE TOWER AND METHOD OF ASSEMBLING

CROSS-REFERENCE TO RELATED APPLICATIONS

The present application is a divisional of U.S. patent application Ser. No. 12/175,138, filed Jul. 17, 2008 now U.S. Pat. No. 7,877,935, which is a continuation of International patent application PCT/DK2006/000027, filed Jan. 17, 2006, which designates the United States, the content of which is incorporated herein by reference.

FIELD OF THE INVENTION

The invention relates to a wind turbine tower comprising at least two annular tower rings placed vertically on top of each other, a wind turbine, a wind turbine tower elevator for use in a wind turbine tower and a method for assembling a wind turbine tower.

BACKGROUND OF THE INVENTION

A wind turbine known in the art comprises a tapered wind turbine tower and a wind turbine nacelle positioned on top of the tower. A wind turbine rotor with three wind turbine blades is connected to the nacelle through a low speed shaft, which extends out of the nacelle front as illustrated on FIG. 1.

Wind turbine towers typically comprise a number of tapered round tower sections mounted on top of each other. The tower sections are usually bolted together through internally placed horizontal flanges, which are welded to the top and bottom of each tower section. Each tower sections comprise a number of tower rings welded to each other. These tower rings are usually made of steel plates, which are rolled into a circular shape and welded to make them constitute a closed 360° ring.

The general idea behind this design is that, the tower has to be relatively easy to assemble at the mounting site and that a round tower without any visible joints is more pleasing to the eye. But in resent years the development of mass-produced wind turbines has moved towards making them bigger and bigger, both in output and in size. This process calls for better and more cost-efficient components and manufacturing methods, and particularly in the field of wind turbine towers, this development has been profound. The manufacturing facilities for large modern wind turbine towers demands a building with a free height of 8 m, access to lifting equipment with a capacity of 70 t and highly specialised and expensive rolling equipment. Furthermore, welding reduces the towers fatigue limit and thereby its strength, which makes it necessary to make the tower or at least parts of the tower of plates thicker than what otherwise, would be necessary.

European patent application EP 1 561 883 disclose a wind turbine tower made of staggered prefabricated metal parts. The metal parts are formed as long substantially rectangular plates, which are open at the side facing the inside of the tower. The parts are bolted together inside the tower through their adjacent sides. Large annular stiffening ring can be provided to the inside of the tower to improve the towers rigidity. This design provides for a polygonal tower where welding in and between the tower sections are severely reduced or eliminated. But the metal parts have a complex design and are thereby difficult and expensive to manufacture.

An object of the invention is to provide for a wind turbine tower without the mentioned disadvantages.

Especially it is an object of the invention to provide for a cost efficient tower design which provides for a simple tower manufacturing process.

Furthermore, it is an object of the invention to provide efficient means for aiding the assembly of the tower and the succeeding maintenance.

SUMMARY OF THE INVENTION

The invention provides for a wind turbine tower comprising at least two annular tower rings placed vertically on top of each other, characterized in that a first tower ring of said at least two tower rings overlaps at least a further tower ring of said at least two tower rings.

It is advantageous to make the tower rings of a wind turbine overlap, in that it provides for a simple tower design which can be manufactured be means of low-tech manufacturing means.

Making the tower rings overlap enables the possibility of connecting the rings by means of mechanical connection means such as screws, bolts or rivets. Hereby welding in the tower is avoided, and especially in areas of the world where the time rate of wages is relatively low, it is economical advantageous to e.g. bolt the rings together, in that even though it might sometime be more time consuming than making welded joints, the bolted tower can be made of thinner plate, hereby reducing the material cost of the tower.

It should be emphasised that in a wind turbine tower known in the art the tower rings are usually welded together in tower sections, which then are bolted together. In a wind turbine tower according to the invention all the connections between the tower rings and sections are in principle the same. This means that when there is referred to tower ring or rings, it could just as well be tower sections, in that a tower section in a tower according to the invention would be a number of tower rings connected in the same way, that the sections would be connected.

In an aspect of the invention, said at least two tower rings overlaps in a substantially horizontal overlap region consisting of a bottom section of a tower ring and a top section of another tower rings.

It is advantageous to make the tower rings overlap at an overlap region as described in that, hereby an advantageous region for connecting the tower rings is established.

In an aspect of the invention, said substantially horizontal overlap region extend in said tower rings longitudinal direction.

Making the overlap region extend in the same direction as the tower rings extend is advantageous in that, it provides for a simple tower design where the tower rings are relatively simple to manufacture and the connection of the tower rings can be made simple e.g. by means of bolts.

In an aspect of the invention, said bottom section and/or said top section are angled in an angle $\alpha$, $\beta$, respectively, in relation to a middle section of said tower rings.

It is advantageous to bend the bottom section and/or the top section of an overlap in that, it provides for a more optimal load distribution through the overlap.

In an aspect of the invention, said angles $\alpha$, $\beta$ are between 0.5° and 15°, preferably 1° and 10° and most preferred between 2° and 7°.

If the angles are too small the load distribution becomes less optimal and if the angles are too big the tower rings becomes more difficult to manufacture and the overlap region becomes less materiel efficient.

The present angle ranges therefore provides for an advantageous relation between good load distribution and use of material.

It should be emphasised the angles α and β not necessary have to be exactly the same.

In an aspect of the invention, said at least two tower rings overlaps downwards, making an upper tower ring overlap a lower tower ring placed immediately beneath said upper tower ring and so on.

Making the tower rings overlap downwards is advantageous in that, the slit between the overlapping rings will face downwards hereby reducing or eliminating the risk of water penetrating the joint, because rain, snow and other will run of the tower surface.

In an aspect of the invention, said at least two tower rings are connected through said substantially horizontal overlap region.

It is advantageous to connect the tower rings through the overlap region in that, it provides for an advantageous place for connecting the tower rings by mechanical connection means such as bolts, screws or rivets.

In an aspect of the invention, said at least two tower rings are connected by bolts.

To connect a load carrying joint in a wind turbine tower by means of welding is a rather complex procedure, which properly has to be preformed by certified welders and possibly controlled afterwards by means of x-ray, ultrasonic or another non-destructive control method, to ensure the quality of the joint. A person providing bolts to a bolted load carrying joint of a wind turbine tower only needs very little instruction to perform the job satisfactory, and the control procedure is much simpler and demands much simpler equipment.

Furthermore the connection could also be made by screws or rivets, but screws are usually more expensive than bolts and traditional rivets are most often too time-consuming to mount.

In an aspect of the invention, said at least two tower rings are of substantially constant height.

Making the tower rings with substantially constant height is advantageous in that, it provides for a simple manufacturing procedure of the tower rings and a simple assembly process of the tower.

In an aspect of the invention, wherein said at least two tower rings are made of steel.

Making the tower rings of steel is advantageous in that, it is a well-proven, relatively inexpensive and strong material, which is very suitable for making wind turbine towers.

In an aspect of the invention, said at least two tower rings comprise at least two tower plates.

By making the tower rings of a number of tower plates it is possible to manufacture the plates in a manufacturing facility with less free height, than the full tower ring diameter and the plates are smaller and lighter than a full tower ring and thereby easier to manage during manufacturing. Furthermore, the design of traditional welded towers is limited by the fact that the tower sections or rings have to be able to pass under bridges, high-voltage cables etc. during transport. By making the tower rings of a number of tower plates it is possible to transport the tower as individual plates which are assembled at or in close proximity of the erection site. Hereby it is possible to design towers with better load transferring qualities, such as a tower which is e.g. more than 10 meters in diameter at the base of the tower.

In an aspect of the invention, said at least two tower rings comprise between 1 and 50, preferably 3 and 30 and most preferred between 5 and 11, such as 8 horizontally juxtaposed tower plates.

The manufacturing and assembly cost increases with the number of tower plates in a tower ring, but if the number of plates becomes to low, the plates become bigger and thereby more difficult to handle, and the previously mentioned advantages are thereby reduced or disappears.

The present plate number ranges therefore provides for an advantageous relation between manufacturing and assembly cost and the ability to manage the plates reasonably easy.

In an aspect of the invention, said at least two tower plates comprise a first vertical or substantially vertical side section and a second vertical or substantially vertical side section where said first side section overlaps a second side section of a horizontally juxtaposed tower plate.

Making the tower plates overlap sideward is advantageous in that, it enables the possibility of connecting the tower plates by mechanical connection means such as screws, bolts or rivets.

In an aspect of the invention, said at least two tower plates are connected through said overlap by means of bolts.

This provides for an advantageous embodiment of the invention.

In an aspect of the invention, said at least two tower plates comprise between 1 and 5, preferably 2 or 3 vertically or substantially vertically bends.

The manufacturing costs increases with the number of bends, but regarding load distribution the optimal tower ring design is round e.g. in that the tower has to transfer the moment of wind loads from all directions.

The present bend number ranges therefore provides for an advantageous relation between manufacturing cost and advantageous load transferring qualities.

In an aspect of the invention, said at least two tower plates has a bottom width which are wider than the width of the top width.

Making the tower plates wider at the bottom than at the top is advantageous in that, it provides for a simple way of making the tower wider at the bottom than at the top, which provides for an advantageous tower design load-transferring wise.

In an aspect of the invention, said tower plates in a tower ring are substantially identical in shape.

Making all the tower plates of a specific tower ring identical is advantageous in that, it simplifies the manufacturing and assembly process.

In an aspect of the invention, said at least two tower plates comprise a cut-out in at least one corner.

Providing the tower plates with a cut-out in at least one corner is advantageous in that, it enables the possibility of making the tower plates overlap both up and down and sideward.

In an aspect of the invention, said at least two tower plates has an longitudinal extend of between 1 and 50 m, preferably between 3 and 30 m, and most preferred between 7 and 15 m.

The longer the plates are, the more difficult they are to handle, and the shorter they are, the higher the manufacturing and assembly costs becomes of a tower of a given height.

The present length ranges therefore provides for an advantageous relation between manufacturing and assembly costs and advantageous handling qualities.

E.g. if each tower ring of a 80 meter high wind turbine tower comprise eight tower plates and each of these tower plates are approximately 11 meters long, the entire disassembled tower can be fitted into three standard 40 feet transport containers.

In an aspect of the invention, said at least two tower rings are tapered making them wider at the bottom section than at the top section.

Making the tower rings wider at the bottom than at the top is advantageous in that, it provides for an advantageous tower design regarding transferring of loads.

In an aspect of the invention, said at least two tower rings are polygonal shaped.

By making the tower polygonal, expensive and complex rolling equipment is avoided, in that the rings can be shaped by means of a number of vertical or substantially vertical bends. Hereby the shaping of the tower rings are not restricted to plants comprising highly specialised rolling mills, but the rings can be made on much more simple and common bending machines found all over the world. This enables the manufacturing of the towers near their mounting site, even though these areas often are rather remote, and hereby transporting the towers over long distances is avoided.

The invention further provides for a wind turbine comprising a wind turbine tower according to certain of the claims.

Even further the invention provides for a wind turbine tower elevator for use in a wind turbine tower, characterized in that said elevator comprises means for enabeling both vertically and horizontally movement of said elevator.

Providing a wind turbine tower with a wind turbine tower elevator, which comprises means for making said elevator move both vertically and horizontally, is advantageous in that, it enables easy access to substantially the entire inside surface of the tower. Hereby it is made easy to access the section joints and other both during erection of the tower and succeeding maintenance.

In an aspect of the invention, said elevator comprise means for making an elevator basket of said elevator maintaining a constant distance to the inside surface of said wind turbine tower.

If the tower taper, making it wider at the bottom than at the top, it is advantageous that the elevator maintains a substantially constant distance to the inside surface of the tower rings, in that a person operating the elevator is able to reach all or almost all the bolts during control or tightening up.

In an aspect of the invention, said means comprise a number of rails attached to the inside of said tower by means of magnets.

It is advantageous to provide the inside surface of the tower with a number of rails, in that they provides for a simple way of maintaining a substantially constant distance between the elevator and the inside surface of the tower rings. Furthermore, it is advantageous to attach these rails by means of magnets, in that it provides for a simple way of attaching the rails and at the same time avoiding welding.

In an aspect of the invention, said means enabeling horizontally movement of said elevator comprise a substantially horizontal annular rail.

Using an annular rail for enabling the elevator to move in the horizontal plane is advantageous, in that it provides for a simple and well-proven way of moving loads in a horizontal plane.

In an aspect of the invention, said wind turbine tower is a wind turbine tower according to certain of the claims.

A tower according to the invention comprises a multitude of e.g. bolted joints. Providing the tower with an elevator according to the invention is advantageous, in that it hereby is easy to access the joints connecting the tower rings and/or the tower plates. Both during the assembly of the tower, immediately after and at certain intervals during the towers life the bolts of the joints has to be controlled and possibly tightened up. An elevator, which easily can be positioned in front of or in close proximity of these bolts no matter their "radial" or "axial" position in the tower, is therefore advantageous.

The invention further provides for a method for assembling a wind turbine tower. Said method comprising the steps of establishing at least two tower rings, mounting a first tower ring of said at least two tower rings on at least a further tower ring of said at least two tower rings, making said first tower ring overlap said further tower ring, and connecting said first tower ring and said further tower ring through their overlap by use of connection means.

Hereby is achieved an advantageous wind turbine tower assembly method according to the invention.

In an aspect of the invention, said connection means are tightened up by use of an elevator which comprises means for enabling both vertically and horizontally movement of said elevator.

Bolted joints in a wind turbine tower has to be tightened up several times during the life of the tower due to vibrations, varying temperatures and loads etc., and doing this by use of an elevator, which can move both vertically and horizontally, is advantageous in that, it provides easy access to the bolts.

In an aspect of the invention, an elevator basket of said elevator maintains a substantially constant distance to the inside surface of said tower rings.

In an aspect of the invention, said assembling is done at or in close proximity of the mounting site where said wind turbine tower is to be erected.

Assembling the tower at or in close proximity of the site where the tower is to be erected is advantageous, in that transport over long distances, of large tower parts which are difficult to manage, is avoided. Furthermore, assembling the tower at or in close proximity of the erection site is possible due to the fact, that a bolted load carrying joint can be made correctly even under relatively primitive conditions, whereas a welded load carrying joint demands a more controlled environment to be made reliably.

BRIEF DESCRIPTION OF THE DRAWINGS

The invention will be described in the following with reference to the figures in which.

DETAILED DESCRIPTION OF THE INVENTION

Figure 1:
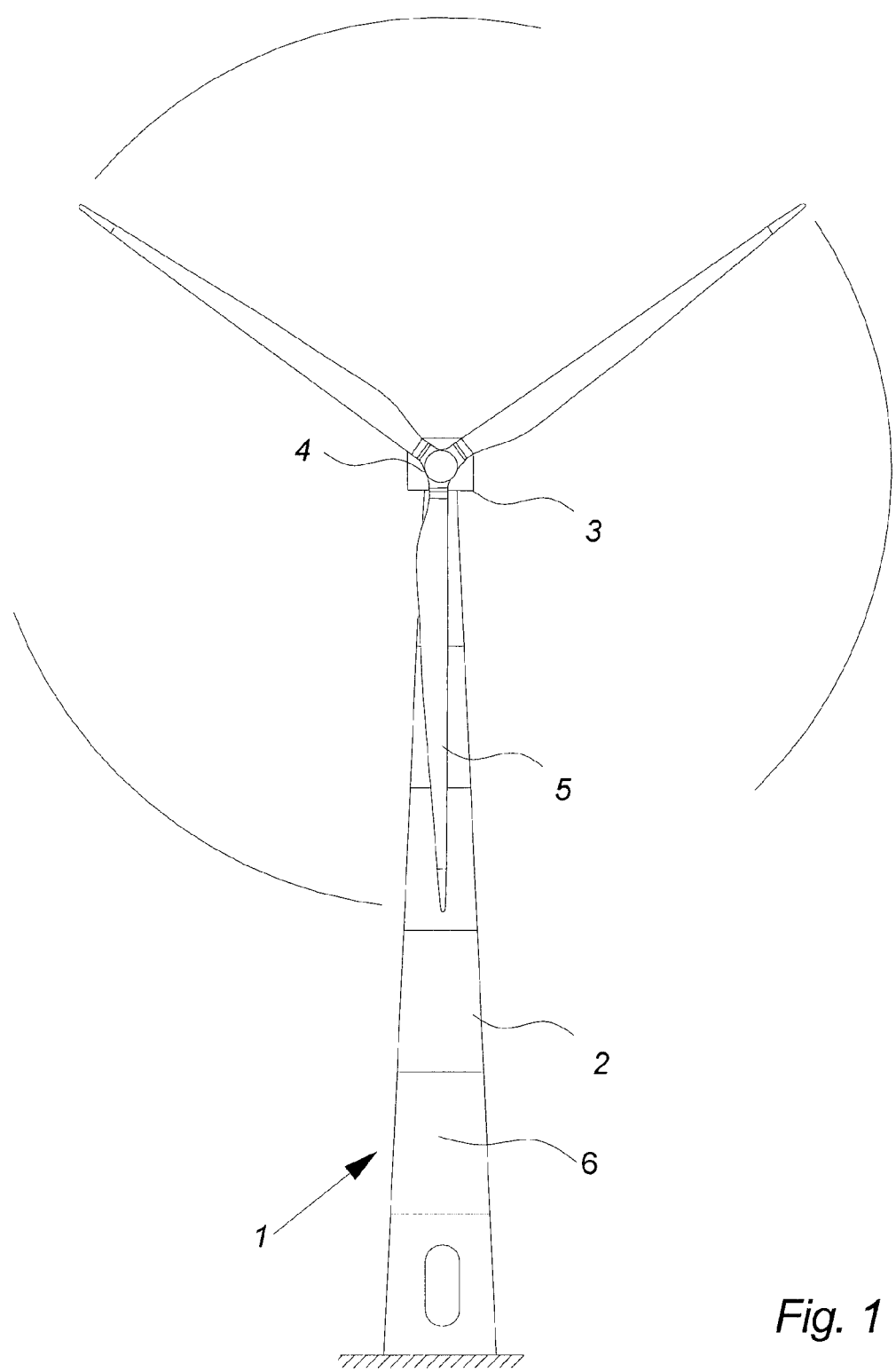
FIG. 1 illustrates a large modern wind turbine known in the art, as seen from the front.

FIG. 1 illustrates a wind turbine 1 known in the art, comprising a tapered tower 2, which is subdivided into a number of tower sections 6. A wind turbine nacelle 3 is positioned on top of the tower 2.

The wind turbine rotor 4, comprising a number of wind turbine blades 5, is connected to the nacelle 3 through the low speed shaft which extends out of the nacelle 3 front.

Figure 2:
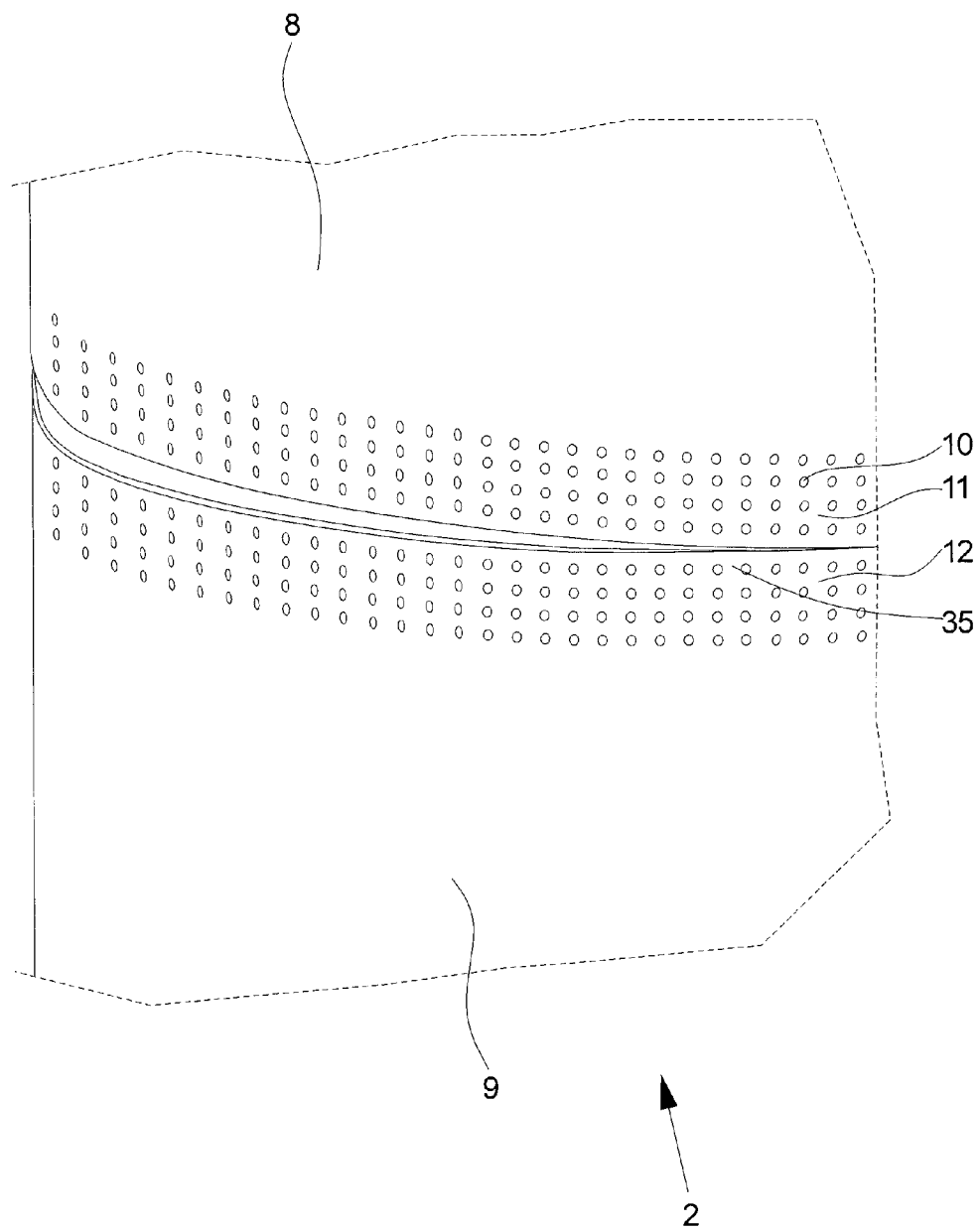
FIG. 2 illustrates a section of a wind turbine tower according to the invention immediately before the assembly of two round tower rings, as seen in perspective.

FIG. 2 illustrates a section of a wind turbine tower 2 according to the invention immediately before the assembly of two round tower rings 14, as seen in perspective. FIG. 2 shows an upper tower ring 8 on its way to be placed on a lower tower ring 9 making the bottom section 11 of the upper ring 8 overlap the top section 12 of the lower ring 9 in a horizontal overlap region 35. When the tower rings 8, 9 are in place the two rings are joined by bolting or riveting the rings 8, 9 together through the rows of bolt holes 10.

In this embodiment of the invention the tower rings 8, 9 are made as full 360° annular round rings. To make a ring overlap another ring the diameter of the bottom section 11 of the upper tower ring 8 has to be approximately or at least two plate thicknesses greater or smaller than the diameter of the top section 12 of the lower tower ring 9. This could be done by making the rings 8, 9 taper in their entire vertical extent in parts of their vertical extent or the bottom and/or top section 11, 12 could be provided with a number of bending cut-outs, enabling that the sections 11, 12 where bended and therefore could overlap—even though their diameters where the same before they where bended.

Figure 3:
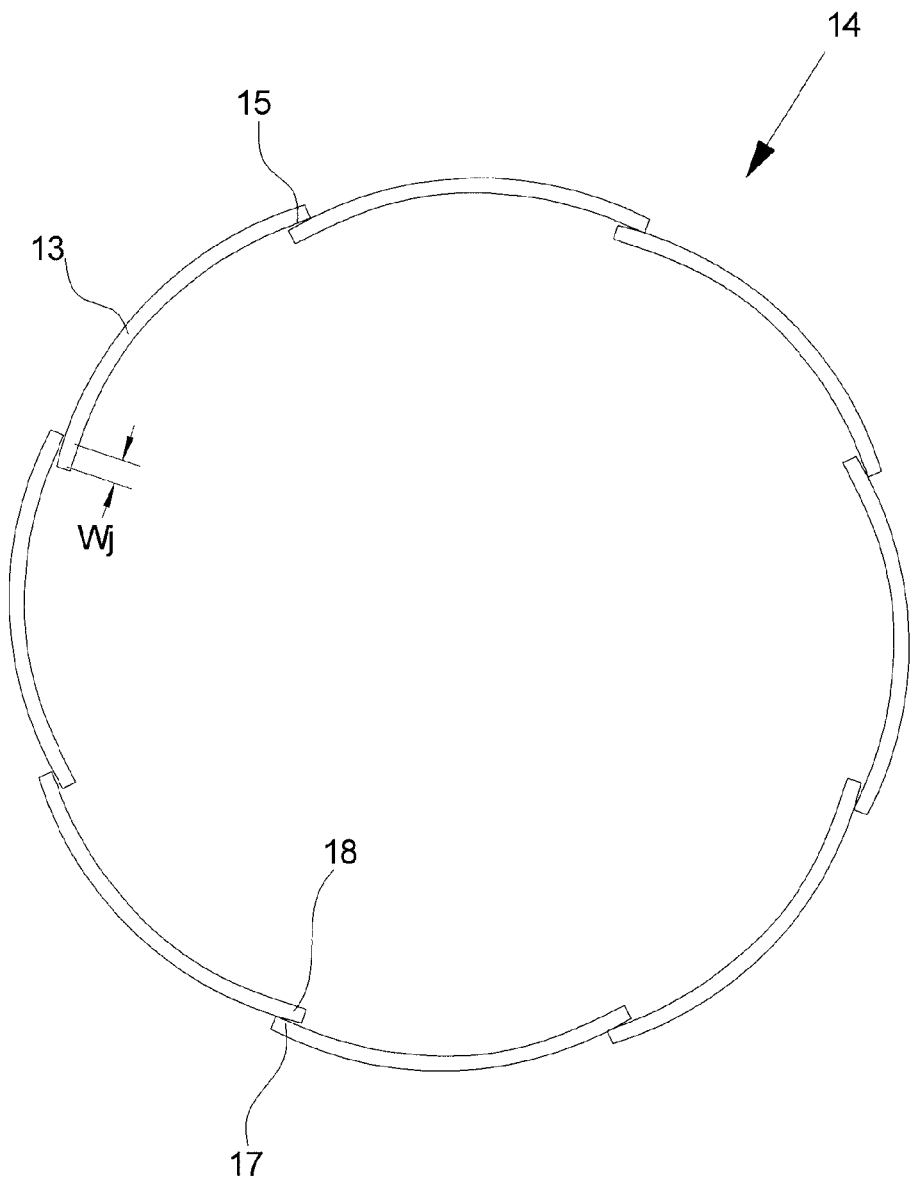
FIG. 3 illustrates an embodiment of a round tower ring, as seen from above.

FIG. 3 illustrates a round annular tower ring 14 as seen from above. In this embodiment of the invention the tower ring 14 is made of eight tower plates 13, but in another embodiment of the invention, the tower ring 13 could comprise fewer or more tower plates 13, such as six, seven, nine or ten.

In this embodiment of the invention the tower ring 14 has a constant uniform cross-section in its longitudinal direction, making the tower ring 14 substantially cylindrical, but in a preferred embodiment of the invention the tower plates could be wider at the bottom than at the top, making the tower ring 14 tapered or substantially conical.

In this embodiment of the invention a first side section 17 of a tower plate 13 overlaps a second side section 18 of a horizontally adjacent tower plate 13. The first side section 17 of said adjacent tower plate 13 then overlaps a second side section 18 of a further tower plate 13 and so on. This pattern continues all the way around with constant width (Wj) of the vertical joints, making the tower design uniform, but in another embodiment of the invention every other plate 13 could overlap its horizontally neighboring plates 13 to both sides.

Figure 4:
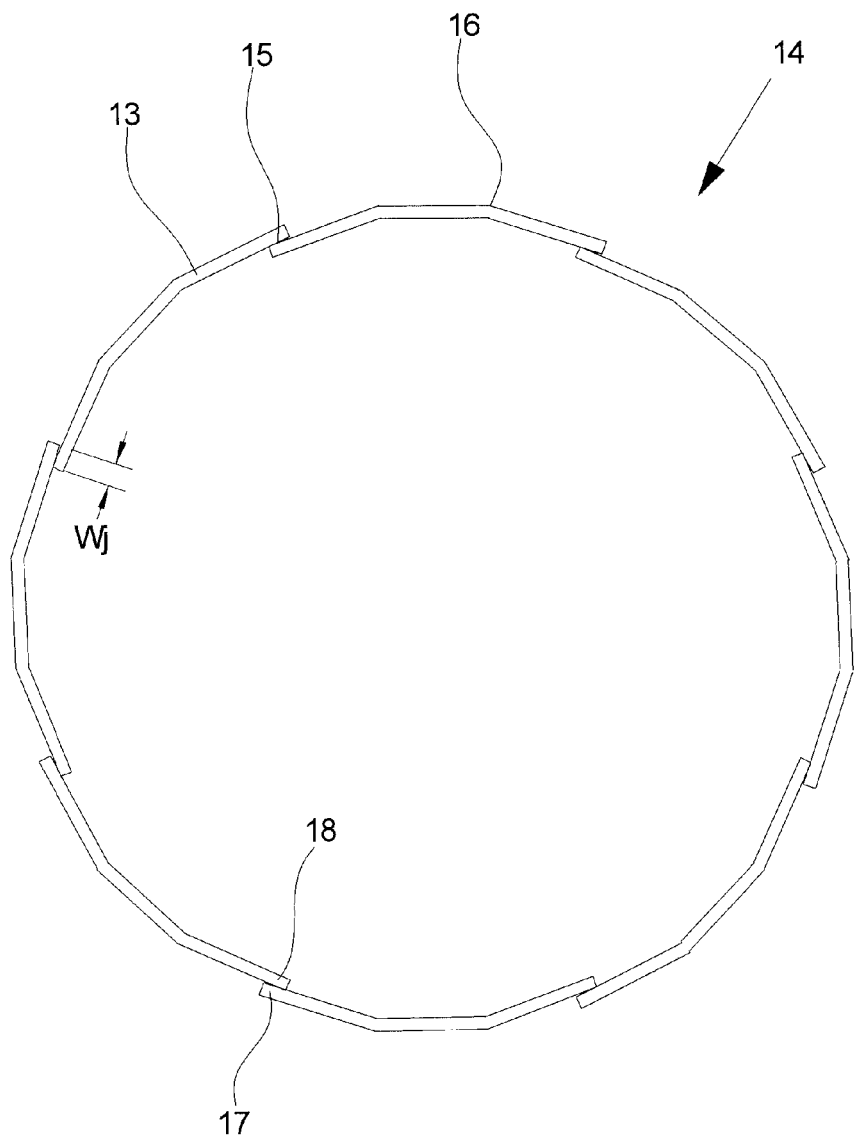
FIG. 4 illustrates an embodiment of a polygonal tower ring, as seen from above.

FIG. 4 illustrates a polygonal annular tower ring 14 as seen from above.

In this embodiment of the invention all the tower plates 13 are substantially identical, and each plate 13 comprise two vertical or substantially vertical bends 16 making the tower ring 14 polygonal, with in this case twenty four sides, but in another embodiment the plates 13 could comprise another number of bends 16 such as three or four, making the ring 14 thirty two or forty sided, if the tower ring 14 comprise eight tower plates 13.

In an even further embodiment of the invention the tower plates 13 of the tower ring 14 could be welded together or the tower ring could be made of one tower plate 13 comprising a plurality of bends 16 which where bolted or welded to join its two ends.

Figure 5:
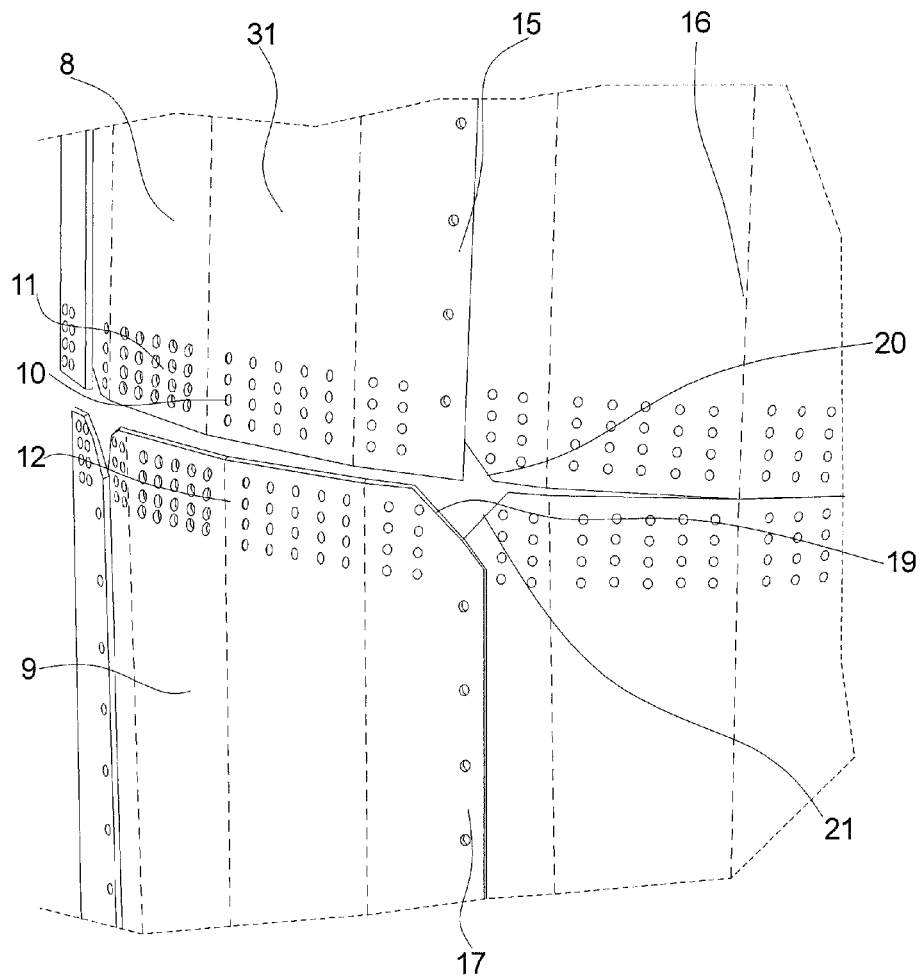
FIG. 5 illustrates a section of a wind turbine tower according to the invention immediately before the assembly of two polygonal tower rings, as seen in perspective.

FIG. 5 illustrates a section of a polygonal wind turbine tower 2 according to the invention immediately before the assembly of two tower rings 14, as seen in perspective. FIG. 3 shows an upper tower ring 8 on its way to be placed on a lower tower ring 9 making the bottom section 11 of the upper ring 8 overlap the top section 12 of the lower ring 9 in a horizontal overlap region 35. At this time of the assembly process the tower plates 13 in the two tower rings 14 would be bolted together at their vertical joints 15, but in FIG. 3 the vertical joints 15 are illustrated without connection means such as screws, bolts or rivets.

FIG. 5 further illustrates that in order to make the upper and the lower tower ring 8, 9 overlap, at least one corner of the plates 13 has to be removed. In this embodiment of the invention three corners or each plate 13 are chamfered. A first top corner 19 of a plate 13 in the lower tower ring 9 and a first bottom corner 20 of a plate 13 in the upper tower ring 8 are chamfered to make it possible for the plates 13 to overlap both vertically and horizontally. The second top corner 21 is also chamfered in this embodiment of the invention to ensure free access to otherwise covered bolt holes. In another embodiment a second bottom corner could also be chamfered to ensure free access to bolt holes.

In another embodiment of the invention only one corner of each plate 13 is chamfered or the corner or corners could comprise a cut-out of another shape such as rectangular, polygonal or some other regular or irregular shape.

Figure 6:
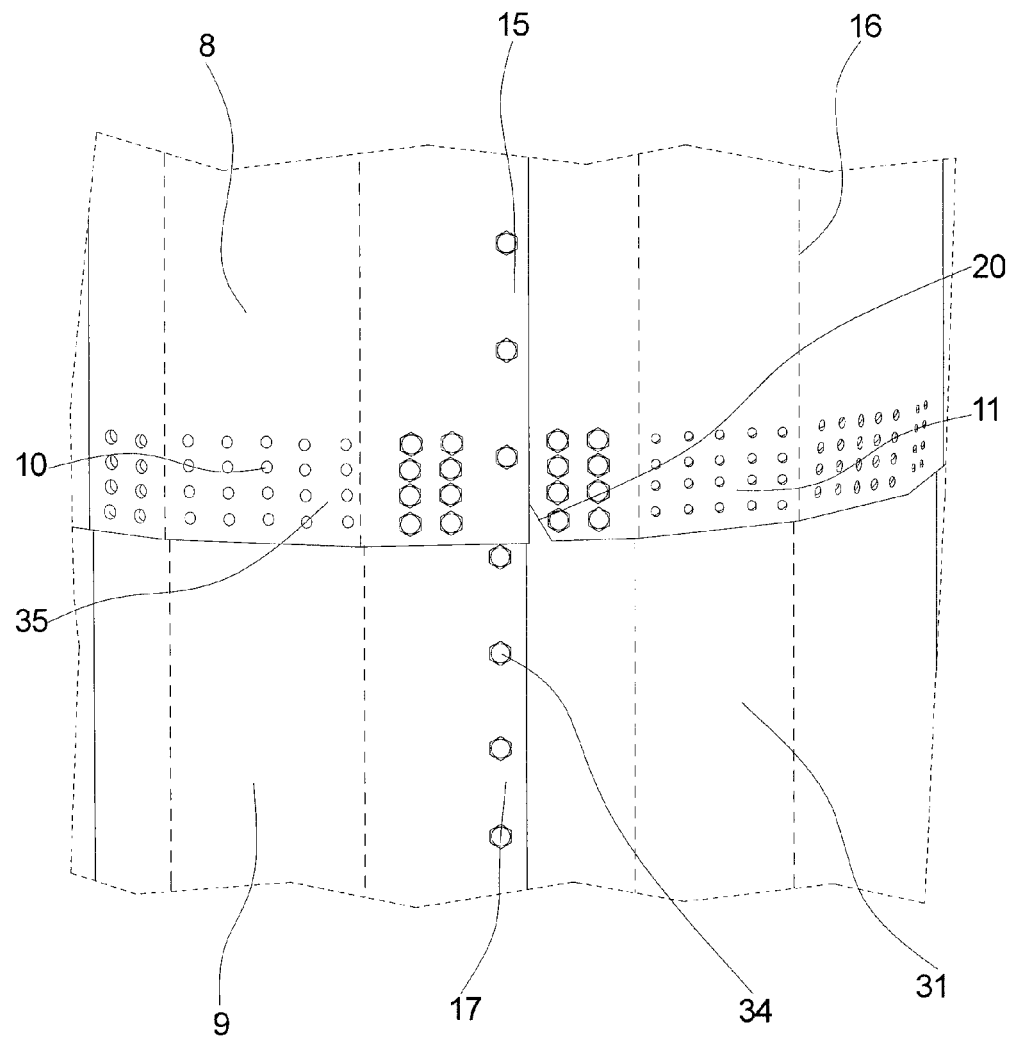
FIG. 6 illustrates a section of a wind turbine tower according to the invention during the assembly of two polygonal tower rings, as seen in perspective.

FIG. 6 illustrates a section of a wind turbine tower 2 according to the invention during the assembly of two polygonal tower rings 14 as seen in perspective. In this embodiment only some of the bolt holes are provided with connection means, which in this case are bolt 34 provided with nuts on the inside of the tower 2, but when the assembly process is finished, all the bolt holes will be provided with connection means.

In this embodiment of the invention the chamfering of the first bottom corner 20 of a plate 13 is visible, but in a preferred embodiment of the invention the cut-out, accommodating room for the corners of the overlapping plates 13, could be completely covered by an overlapping plate 13.

Figure 7:
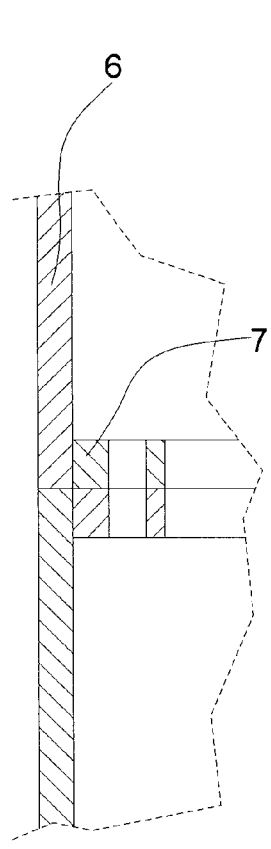
FIG. 7 illustrates a part of a cross-section of a tower section joint known in the art.

FIG. 7 illustrates a part of a cross-section of a tower section 6 joint known in the art. As illustrated in FIG. 1, a traditional wind turbine tower 2 comprises a number of tapered round tower sections 6 mounted on top of each other. The tower sections 6 are bolted together through the internally placed horizontal flanges 7, which are welded to the top and bottom of each section 6.

Figure 8:
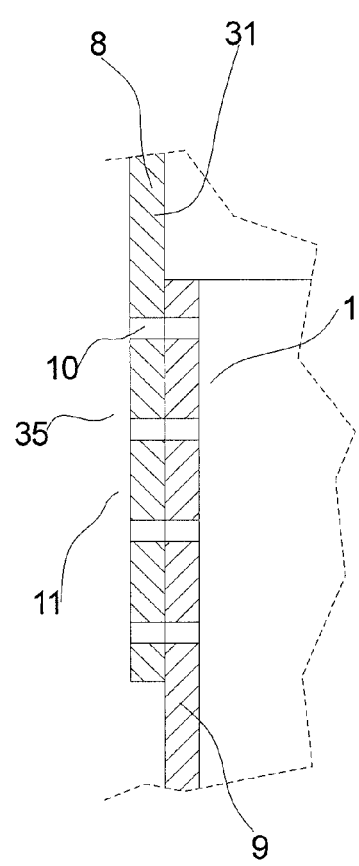
FIG. 8 illustrates a part of a cross-section of an embodiment of a tower ring joint according to the invention.

FIG. 8 illustrates a part of a cross-section of an embodiment of a tower ring 14 joint according to the invention.

If a wind turbine tower 2 comprises tower rings 14 according to the invention, at least all or substantially all the horizontal overlap regions 35 between the tower rings 14 are connected by mechanical connection means such as screws, bolts, studs or rivets. Since the tower rings 14 are connected in this way throughout or substantially throughout the length of the tower 2, there is no difference between a tower section 6 joint and a tower ring 14 joint in a wind turbine tower 2 according to the invention.

In this embodiment a bottom section 11 of the upper tower ring 8 overlaps a top section 12 of the lower tower ring 9. The two rings are then joined by means of bolts, screws, studs or rivets through the four rows of bolt holes 10. In another embodiment of the invention the overlap region 35 could comprise another number of bolts rows such as one, two, three, five or six and in another embodiment the lower tower ring 9 could overlap the upper tower ring 8.

Figure 9:
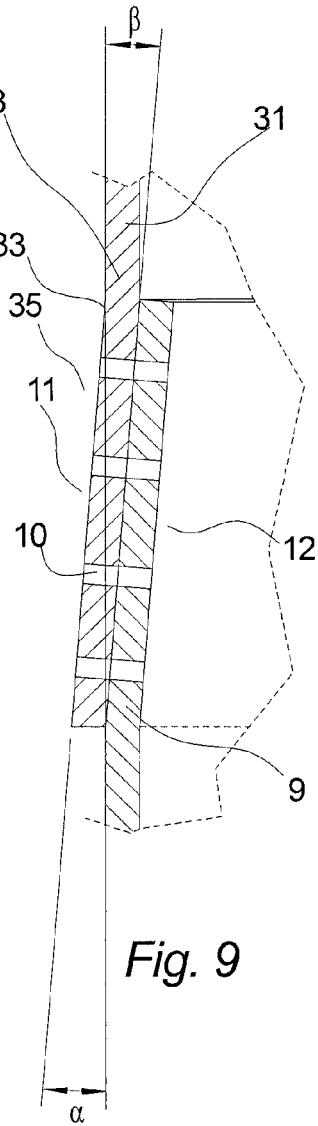
FIG. 9 illustrates a part of a cross-section of another embodiment of a tower ring joint according to the invention.

FIG. 9 illustrates a part of a cross-section of another embodiment of a tower ring joint according to the invention. This is in principle the same type of tower ring joint design as illustrated in FIG. 8. The tower rings 8, 9 are usually tapered making the tower 2 wider at the bottom than at the top. In this embodiment the bottom section 11 of the upper tower ring 8 is bended in an angle α and top section 12 of the lower tower ring 9 is bended in an angle β, making the bottom and top section 11, 12 taper in another angle than the middle section 31 of the tower ring 14. The two bending angles α, β could be the same, such as 5°, but in another embodiment of the invention the bending angle α could be slightly bigger (e.g. 2°) than the bending angle β, making the top section 12 of the lower tower ring 9 press outwards against the bottom section 11 of the upper tower ring 8, when the rows of bolt holes 10 are aligned.

In this embodiment of a horizontal overlap region 35, not all the load of the tower rings 14, nacelle 3 etc. placed above the joint, are carried by the connection means. The inside of the bottom section 11 of the upper tower ring 8 presses down on the outside of the top section 12 of the lower tower ring 9 hereby providing a more optimal load distribution through the joint.

Figure 10:
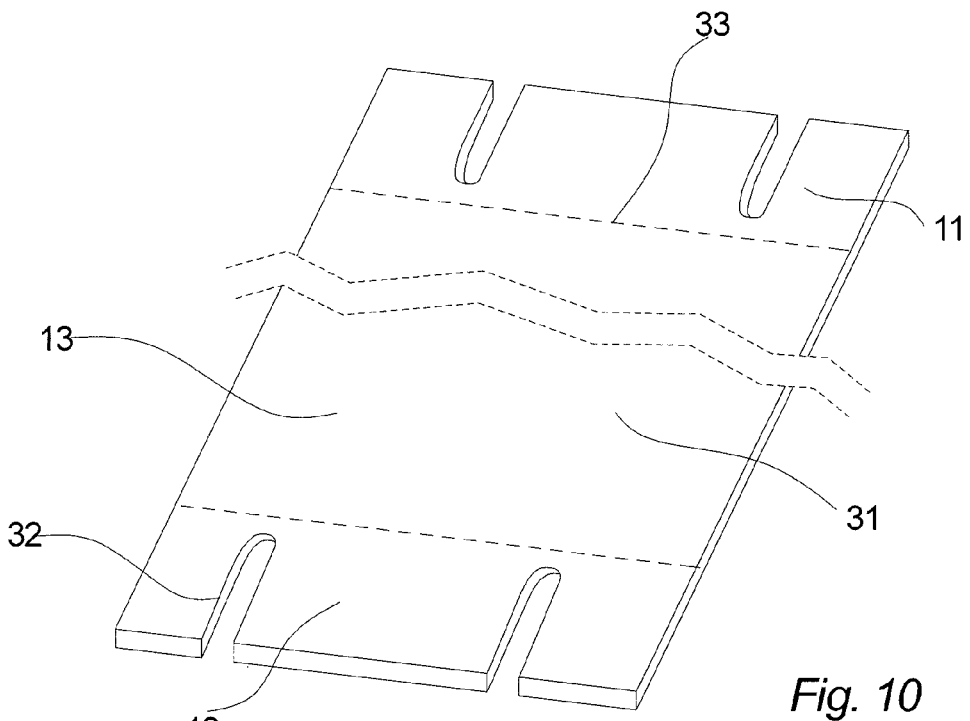
FIG. 10 illustrates an embodiment of a tower plate before it has been bended.

FIG. 10 illustrates an embodiment of a tower plate 13 before it has been bended. If the tower ring 14 is made of tower plates 13 which comprise angled bottom and top sections 11, 12, the bottom and top sections 11, 12 could comprise bending cut-outs 32, to enable, that the plate 13 can be bended both horizontally and vertically. FIG. 10 illustrates that the tower plate 13 is provided with four vertical bending cut-outs 32 before the bottom and top sections 11, 12 are bended along the horizontal bend 33.

Figure 11:
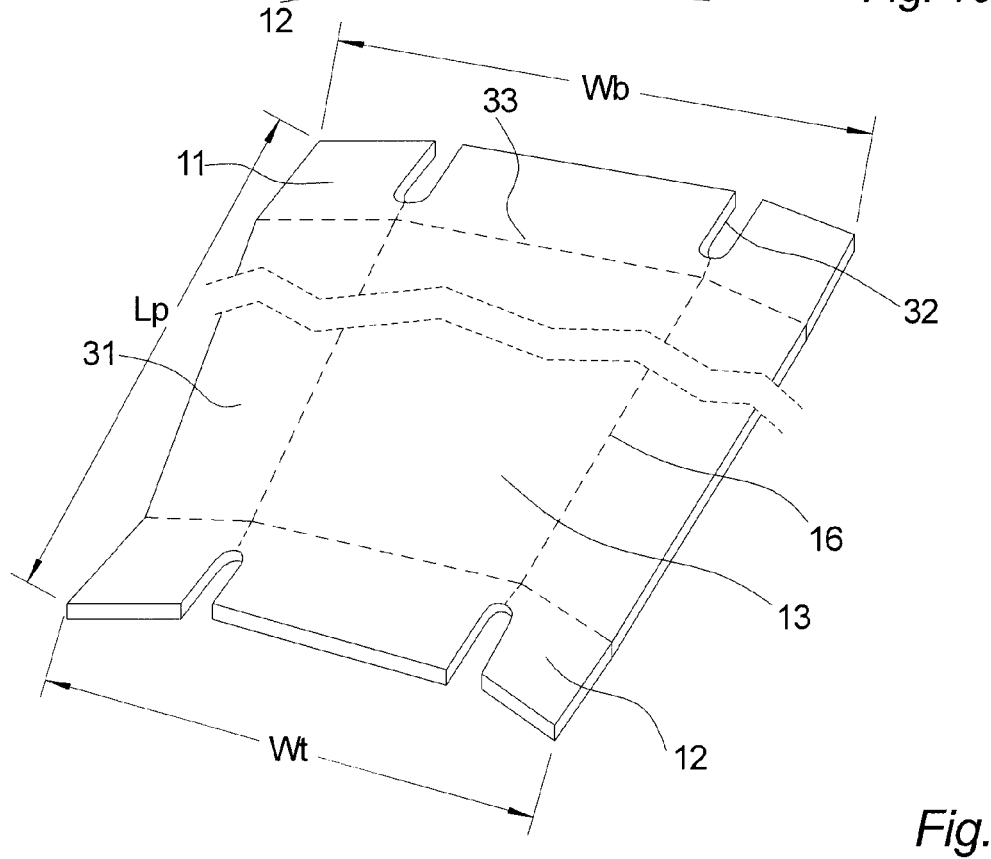
FIG. 11 illustrates the same embodiment of a tower plate as illustrated in FIG. 10 after it has been bended.

FIG. 11 illustrates the same embodiment of a tower plate 13 as illustrated in FIG. 10 after it has been bended. Because of the bending cut-outs 32 the plate 13 can be provided with vertical bends 16 after the bottom and top sections 11, 12 has been bended without deforming the bottom and top sections 11, 12.

FIG. 11 further illustrates that the plate 13 has a bottom width Wb, which are wider than the width of the top width Wt. A tower ring 14 made of tower plates 13, which are wider at the bottom than at the top, will also be wider at the bottom than at the top, provided that the vertical joints 15 are of constant width Wj, which they are in a tower according to the invention. Hereby the tower rings 14 taper.

The tower plates 13 can be made of a length Lp, which makes them easy to transport, e.g. in standard ISO 40 feet containers.

Figure 12:
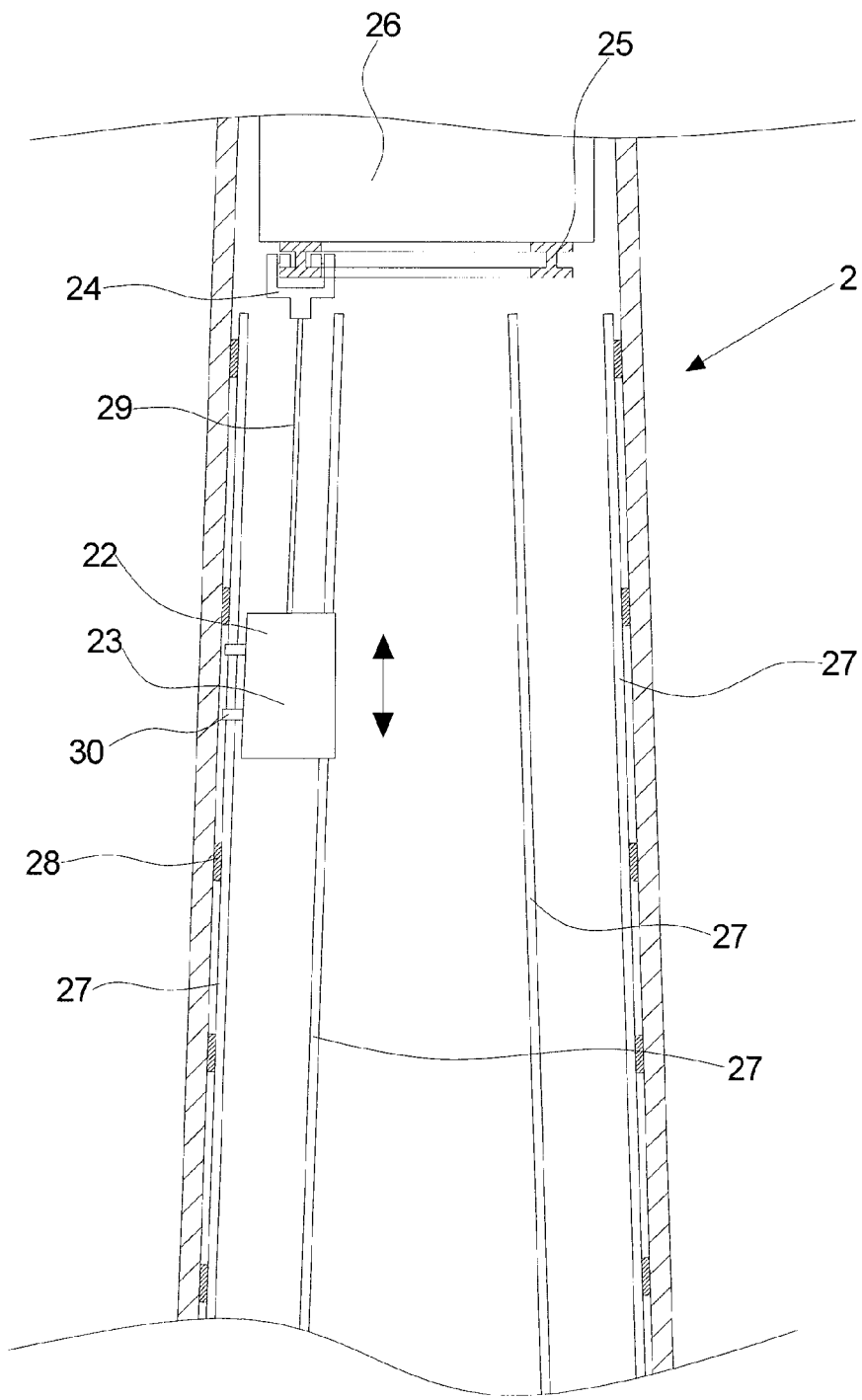
FIG. 12 illustrates a cross-section of a wind turbine tower according to the invention, comprising an embodiment of an elevator, as seen from the side.

FIG. 12 illustrates a cross-section of a wind turbine tower 2 according to the invention, comprising an embodiment of an elevator 22, as seen from the side. To service the bolted joints the tower is—in this embodiment of the invention—provided with an elevator 22. The elevator 22 comprises an elevator basket 23, which also could be a cage, a platform or other. The elevator basket 23 is connected to lifting equipment 24 via one or more cables 29 to make the elevator basket 23 go up and down.

In this embodiment of the invention the lifting equipment 24 is mounted on a horizontal annular or substantially annular rail 25 at or in close proximity of the top of the tower 2. In this embodiment the annular rail 25 is mounted on a vibration damper 26 at the top of the tower 2 but in another embodiment the rail 25 could be otherwise attached directly or indirectly to the tower 2, to the nacelle 3, to the yaw mechanism (not shown) or other. The annular rail 25 enables, that the elevator baskets 23 starting point at the top of the tower 2, can be moved, hereby allowing the basket 23 to be lifted and lowered along the entire inside of the tower 2.

In this embodiment the tower 2 is tapered, giving a circle going through all the bends 16 at the top of the tower 2 a diameter of approximately 2.5 meters and 4.3 meters at the bottom of the tower 2. Since the elevator 22 is mainly for tightening up the bolted joints during the assembly of the tower and throughout the towers life, it is essential that these joins can be reached all the way down the inside of the tower 2. In this embodiment the tower 2 is therefore provided with a number of vertical or substantially vertical guides 27, which in this case are vertical rail 27 connected to the inside of the tower 2. If e.g. 60° of the 360° tower rings 14 can be reached from a given horizontal position, the tower 2 could e.g. be provided with six vertical rails 27 or six pairs or parallel vertical rails 27. To avoid welding them to the tower 2, the rails 27 could be connected to the tower by use of bolts, screws, rivets or as illustrated by use of magnets 28.

When the basket 23 is in its top position, it can be moved freely horizontally on the annular rail 25. The basket 23 is then connected to a vertical rail 27 or rail pair by guiding means 30, and when the basket 23 is lowered it will maintain a constant distance to the inside of the tower rings 14, even though the horizontal cross section of the tower rings 14 increases downwards.

In another embodiment of the invention the vertical or substantially vertical guides 27 could be very tight cables connected at the top and the bottom of the tower 2 or other means suitable for maintaining the elevator basket 23 in a constant or substantially constant horizontal distance from the inside surface of the tower 2.

Figure 13:
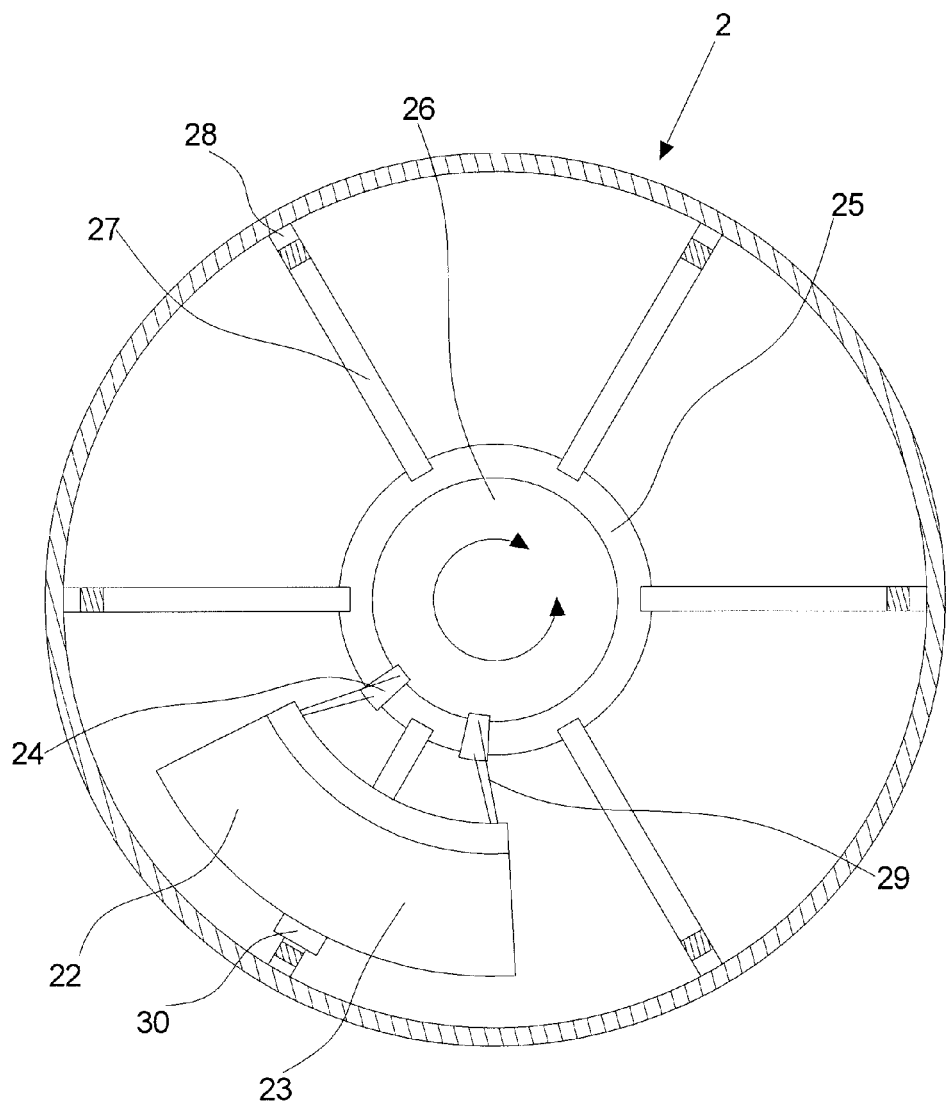
FIG. 13 illustrates a cross-section of a wind turbine tower according to the invention, comprising an embodiment of an elevator, as seen from the bottom.

FIG. 13 illustrates a cross-section of a wind turbine tower according to the invention, comprising an embodiment of an elevator, as seen from the bottom. In this embodiment of the invention the tower is provided with six vertical rails 27 substantially extending from the bottom to the top of the tower 2. The horizontal annular rail 25 is closed, making it describe a full 360° circle, but in another embodiment of the invention the annular rail 25 could be less than a full circle such as between 250° and 330° of a full circle, e.g. making room for a ladder (not shown) to pass, which could extend substantially throughout the entire vertical length of the tower 2.

The invention has been exemplified above with reference to specific examples of overlapping tower rings 14, tower plates 13 and internal elevators 22 for use in a wind turbine 1. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Tower section
7. Horizontal flange
8. Upper tower ring
9. Lower tower ring
10. Row of bolt holes
11. Bottom section of a tower ring 12. Top section of a tower ring
13. Tower plate
14. Tower ring
15. Vertical joint
16. Bend
17. First side section of tower plate
18. Second side section of tower plate
19. First top corner of tower plate
20. First bottom corner of tower plate
21. Second top corner of tower plate
22. Elevator
23. Elevator basket
24. Lifting equipment
25. Horizontal annular rail
26. Vibration damper
27. Vertical guide
28. Magnet
29. Cable
30. Guiding means
31. Middle section of tower ring
32. Bending cut-out
33. Horizontal bend
34. Bolt
35. Horizontal overlap region
Lp. Length of tower plate
α. Bending angle of bottom section
β. Bending angle of top section
Wb. Bottom width of tower plate
Wt. Top width of tower plate
Wj. Width of vertical joints

What is claimed is:

1. A tapered wind turbine tower comprising a wind turbine tower elevator positioned inside said wind turbine tower,
said elevator comprising a guide arrangement that enables both vertical and horizontal movement of said elevator, wherein said guide arrangement comprises a connector guide for attachment of an elevator basket of said elevator to an inside surface of said wind turbine such that the basket maintains a constant distance to the inside surface of said tapered wind turbine tower, and wherein said guide arrangement further comprises at least one vertical or substantially vertical guide connected to said tower.

2. The tapered wind turbine tower according to claim 1, wherein said at least one vertical or substantially vertical guide comprises a plurality of rails attached to the inside of said tower by magnets.

3. The tapered wind turbine tower according to claim 1, wherein said guide arrangement further comprises at least one substantially horizontal annular guide.

4. The tapered wind turbine tower according to claim 1, wherein said wind turbine tower comprises at least two annular tower rings placed vertically on top of each other, wherein a first tower ring of said at least two tower rings overlaps at least a further tower ring of said at least two tower rings.

5. The tapered wind turbine tower according to claim 4, wherein said at least two tower rings are connected through said substantially horizontal overlap region.

6. The tapered wind turbine tower according to claim 5, wherein said at least two tower rings are connected by bolts.

7. The tapered wind turbine tower according to claim 4, wherein said at least two tower rings are made of steel.

8. The tapered wind turbine tower according to claim 4, wherein said at least two tower rings comprise at least two tower plates.

9. The tapered wind turbine tower according to claim 8, wherein said at least two tower plates comprise a first vertical or substantially vertical side section and a second vertical or substantially vertical side section, wherein said first side section overlaps a second side section of a horizontally juxtaposed tower plate.

10. The tapered wind turbine tower according to claim 8, wherein said at least two tower plates are connected through said overlap by bolts.

11. A method for assembling a wind turbine tower by use of an elevator inside said tower, said method comprising the steps of:
establishing at least two annular tapered tower rings,
mounting a first tower ring of said at least two tower rings on at least a further tower ring of said at least two tower rings, such that said first tower ring overlaps said further tower ring, and
connecting said first tower ring and said further tower ring through the overlap by use of a connector, wherein said connector is tightened up by use of said elevator which comprises a guide arrangement that enables both vertical and horizontal movement of said elevator and, wherein said guide arrangement comprises a connector guide for attachment of an elevator basket to the inside surface of said wind turbine tower such that the basket maintains a constant distance to the inside surface of said wind turbine tower, and wherein said guide arrangement further comprises at least one vertical or substantially vertical guide connected to said tower.

12. The method according to claim 11, wherein said at least two tower rings overlap in a substantially horizontal overlap region consisting of a bottom section of a tower ring and a top section of another tower ring.

13. The method according to claim 11, wherein said connector comprises at least one bolt.

14. The method according to any of claim 11, wherein said assembling is done at or in close proximity of the mounting site where said wind turbine tower is to be erected.

* * * * *

UNITED STATES PATENT AND TRADEMARK OFFICE
CERTIFICATE OF CORRECTION

PATENT NO. : 8,051,609 B2
APPLICATION NO. : 12/975607
DATED : November 8, 2011
INVENTOR(S) : Borge Olgaard It is certified that error appears in the above-identified patent and that said Letters Patent is hereby corrected as shown below:

In the Specification:

Column 1, line approx. 33-34, "Each tower sections comprise a" should read --Each tower section comprises a--

Column 1, line approx. 41, "But in resent years" should read --But in recent years--

Column 1, line approx. 53, "thicker than what otherwise, would be necessary." should read --thicker than what otherwise would be necessary--

Column 1, line approx. 62-63, "welding in . . . are severely reduced" should read --welding in . . . is severely reduced--

Column 2, line approx. 24-25, "is economical advantageous" should read --is economically advantageous--

Column 2, line approx. 29, "should be emphasised that" should read --should be emphasized that--

Column 2, line approx. 40-41, "two tower rings overlaps in a" should read --two tower rings overlap in a--

Column 2, line approx. 48, "region extend in said tower rings longitudinal direction." should read --region extends in said tower ring's longitudinal direction.--

Column 2, line approx. 65-67, "if the angles are too big the tower rings becomes more difficult to . . . and the . . . less materiel efficient." should read --if the angles are too big the tower rings become more difficult to . . . and the less material efficient.--

Signed and Sealed this
Eleventh Day of March, 2014

Michelle K. Lee
*Deputy Director of the United States Patent and Trademark Office*

Column 3, line approx. 1, "The present angle ranges therefore provides" should read --The present angle ranges therefore provide--

Column 3, line approx. 4, "the angles α and β not necessary have to be exactly the same" should read --the angles α and β do not necessarily have to be exactly the same--

Column 3, line approx. 6-7, "two tower rings overlaps" should read --two tower rings overlap--

Column 3, line approx. 13, "rain, snow and other will run of" should read --rain, snow and other will run off--

Column 3, line approx. 26, "has to be preformed by certified welders" should read --has to be performed by certified welders--

Column 3, line approx. 31, "perform the job satisfactory, and" should read --perform the job satisfactorily, and--

Column 4, line approx. 4-5, "mentioned advantages are thereby reduced or disappears." should read --mentioned advantages are thereby reduced or disappear.--

Column 4, line approx. 6, "plate number ranges therefore provides" should read --plate number ranges therefore provide--

Column 4, line approx. 8, "manage the plates reasonably easy." should read --manage the plates reasonably easily.--

Column 4, line approx. 23-24, "preferably 2 or 3 vertically or substantially vertically bends." should read --preferably 2 or 3 vertical or substantially vertical bends.--

Column 4, line approx. 25, "costs increases with the" should read --costs increase with the--

Column 4, line approx. 29, "bend number ranges therefore provides" should read --bend number ranges therefore provide--

Column 4, line approx. 32-33, "two tower plates has a bottom width which are wider than the" should read --two tower plates have a bottom width which is wider than the--

Column 4, line approx. 51-52, "two tower plates has a longitudinal extend" should read --two tower plates have a longitudinal extent--

Column 4, line approx. 57, "length ranges therefore provides for" should read --length ranges therefore provide for--

Column 4, line approx. 60-61, "each tower ring of . . . comprise" should read --each tower ring of . . . comprises--

Column 4, line approx. 61-62, "each of these tower plates are approximately" should read --each of these tower plates is approximately--

Column 4, line approx. 63-64, "standard 40 feet transport containers." should read --standard 40-foot transport containers.--

Column 5, line approx. 20-22, "for enabling both vertically and horizontally movement of" should read --for enabling both vertical and horizontal movement of--

Column 5, line approx. 30, "said elevator comprise" should read --said elevator comprises--

Column 5, line approx. 34, "If the tower taper, making it wider" should read --If the tower tapers, making it wider--

Column 5, line approx. 49-50, "said means enabeling horizontally movement of" should read --said means enabling horizontal movement of--

Column 5, line approx. 63-64, "during the towers life the bolts of the joints has to be" should read --during the tower's life the bolts of the joints have to be--

Column 6, line approx. 13, "enabling both vertically and horizontally movement of said elevator." should read --enabling both vertical and horizontal movement of said elevator.--

Column 6, line approx. 15, "Bolted joints in a . . . has to be tightened" should read --Bolted joints in a . . . have to be tightened--

Column 6, line approx. 31, "due to the fact, that a bolted load" should read --due to the fact that a bolted load--

Column 7, line approx. 34-35, "even though their diameters where the same before they where bended." should read --even though their diameters were the same before they were bended.--

Column 7, line approx. 39, "the tower ring 13 could" should read --the tower ring 14 could--

Column 7, line approx. 61, "and each plate 13 comprise two" should read --and each plate 13 comprises two--

Column 7, line approx. 66, "if the tower ring 14 comprise" should read --if the tower ring 14 comprises--

Column 8, line approx. 19-20, "In this embodiment of the invention three corners or each plate 13 are" should read --In this embodiment of the invention three corners of each plate 13 are--

CERTIFICATE OF CORRECTION (continued)
U.S. Pat. No. 8,051,609 B2

Column 8, line approx. 37, "which in this case are bolt 34 provided with nuts on the inside of" should read --which in this case are bolts 34 provided with nuts on the inside of--

Column 9, line approx. 2, "another number of bolts rows such as" should read --another number of bolt rows such as--

Column 9, line approx. 22-23, "the load of the . . . are carried by" should read --the load of the . . . is carried by--

Column 9, line approx. 40-41, "sections 11, 12 has been bended" should read --sections 11, 12 have been bended--

Column 9, line approx. 44, "width Wb, which are wider than" should be --width Wb, which is wider than--

Column 9, line approx. 51-52, "standard ISO 40 feet containers." should read --standard ISO 40-foot containers.--

Column 10, line approx. 11, "throughout the towers life," should read --throughout the tower's life,--

Column 10, line approx. 18-19, "or six pairs or parallel vertical rails 27," should read --or six pairs of parallel vertical rails 27--

In the Claims:

Column 12, line 49, Claim 14, "The method according to any of claim 11," should read --The method according to claim 11,--